June 4, 1968     W. T. RENTSCHLER     3,386,363
PHOTOGRAPHIC SHUTTER WITH ELECTRONICALLY-CONTROLLED
EXPOSURE TIMING DEVICE
Filed Sept. 23, 1964

INVENTOR.
Waldemar T. Rentschler
BY
Arthur A. March
ATTORNEY

United States Patent Office 3,386,363
Patented June 4, 1968

3,386,363
PHOTOGRAPHIC SHUTTER WITH ELECTRONICALLY-CONTROLLED EXPOSURE TIMING DEVICE
Waldemar T. Rentschler, Calmbach (Enz), Germany, assignor to Alfred Gauthier, G.m.b.H., Calmbach (Enz), Germany, a corporation of Germany
Filed Sept. 23, 1964, Ser. No. 398,630
Claims priority, application Germany, Sept. 26, 1963, G 38,790
6 Claims. (Cl. 95—53)

The present invention relates to a photographic shutter with an electronically-controlled exposure timing device, which can be switched on by means of a contact switch operating in response to the actuation of the shutter release.

In shutters of the above-described species, the arrangement is generally such that the contact switch used for switching on the electronically-controlled exposure timing device is opened when the shutter release is released. The timing device is thus capable of functioning only as long as the shutter release is depressed. This adversely affects the operation of the camera because the photographer must pay increased attention to the release of the shutter when effecting certain kinds of exposures, namely, exposures with long exposure times. There is an additional disadvantage in that this known arrangement does not permit the use of a delayed-action device built into the camera or into the shutter, for the reasons explained above.

In cameras with a device for electronic exposure time control consisting of a delaying arrangement, including a resistance-capacitance, or RC, it has heretofore been proposed to incorporate with this device a relay, which is coupled to the release member, and is released only after the desired exposure time span has terminated. This arrangement is still imperfect, since it requires considerable expenditure for additional structural members, especially contact switches and the like. There is still another disadvantage in that the relay can be associated only with those timing devices provided with an RC combination.

The principal object of the present invention is to create a structurally simple photographic shutter of the above-described species which allows the photographer to carry out those exposures in which the release of the release member is effected prior to the completion of the actual running down of the shutter.

The present invention provides for a locking device which retains the contact switch in the closed position reached upon depression of the shutter release until the running down of the exposure is completed. The result is that shutter release member can be released immediately after the release of the shutter has been effected, without any adverse effect either on the further running down of the shutter, or the function of the electric circuit. This means that the photographer no longer needs to pay special attention to the release of the shutter, as was necessary in the known shutter arrangement with electronic exposure time formation. Another advantage of the invention is that the simplification in the mode of operation of the camera is obtained with a simple mechanical locking device.

According to another proposal of the invention, the locking device may be a two-armed, spring-loaded arresting lever, one arm of which cooperates with an actuating lever associated with the contact switch and the other arm of which is arranged in the path of motion of the main driving disc of the shutter. The main driving disc is to return the arresting lever to its inoperative starting position in a phase of motion the disc having no influence on the exposure.

In order to obtain exposure times of any desired duration, such as are required for effecting B-exposures, another feature of the invention provides for a manually operable setting member which is used to hold the arresting lever in its inoperative position. The manual setting member is designed so that it can be set either at a B setting position, an A (automatic) setting position, or at a range of exposure times. Moreover, the setting member comprises a cam which secures the arresting lever in its inoperative starting position when the setting member is set at the B position.

In shutters whose electronic timing device comprises a delayed-action mechanism consisting of a resistor and a capacitor, there is arranged in the charging circuit of the capacitor, a contact switch controlled by the shutter drive. The contact switch is adjusted to open when the running down process of the shutter starts, thereby permitting the capacitor to charge. In such an arrangement, the influence of the capacitor on the exposure time span in the case of B-exposures, can be eliminated through the use of another contact switch connected in parallel with the first contact switch and which is closed when the setting member is moved to the B setting position.

An embodiment of the invention will now be explained by way of the accompanying drawing, in which.

Figure 1:
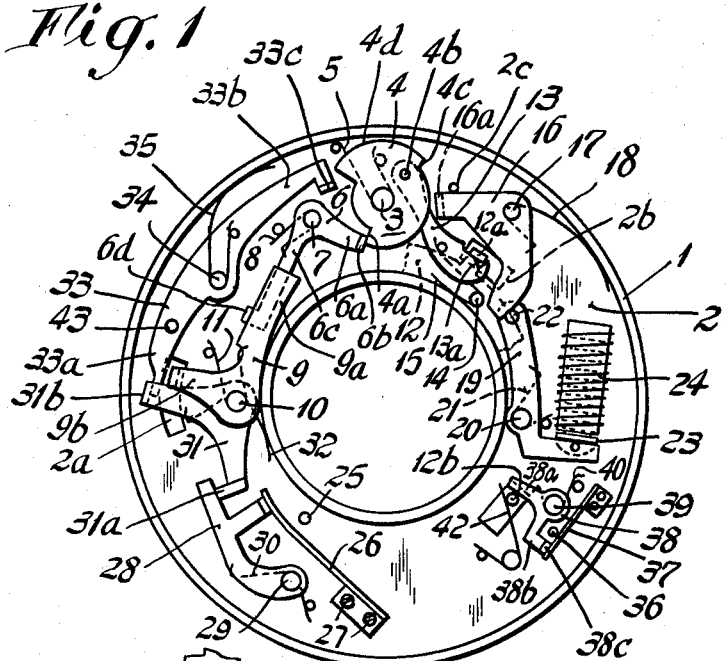
FIG. 1 shows the locking device on a photographic intra-lens shutter with an electronic timing device.

Referring now to the drawing, base plate 2, which serves for the positioning of well-known members of the shutter mechanism, is fixed in the shutter housing 1 of a photographic intra-lens shutter. A shaft 3 is rotatably mounted in the base plate 2 and carries at one end a shutter driving disc 4. The free end of the shaft 3 may project from the rear of the shutter and be coupled, in a known way, to the film transport device of the camera for the purpose of cocking the driving disc 4. A spring 5 is arranged on the shaft 3 to exert a clockwise movement of rotation on the driving disc.

An arresting lever 6, pivotally mounted on a pin 7, keeps the driving disc 4 in the cocked position illustrated in FIG. 1. The arresting lever 6 is influenced by a coil spring 8 which tends to rotate it counterclockwise. One arm 6a of the arresting lever 6 includes a bent-off lug 6b by which it engages a projection 4a of the driving disc 4 when the latter is in cocked position. The other arm 6c of the arresting lever 6 includes a bent-off outer end 6d which is pressed against a two-armed release lever 9 by the spring 8. The arm 9a of the release lever 9 faces the arm 6c of the arresting lever 6 and projects into the path of motion of the latter. The release lever 9 is pivotally mounted on an axis 10 of the base plate 2 and has a clockwise rotational tendency due to the action of a coil spring 11. The other arm 9b of the release lever 9 is bent off at a right angle and projects from the rear of the shutter through a slot 2a in the base plate 2. In addition, the arm 9b is operatively connected in a known manner, to the shutter release, which is not shown in the drawing for the sake of clarity.

A fragment of ring 12, designed for driving the shutter blades, is rotatably arranged on the back side of the base plate 2, as viewed in FIG. 1. In order to actuate the driving ring 12, a driving pawl 13 is articulately arranged on a pin 4b of the driving disc 4. The free end of the driving pawl 13 comprises coupling jaws 13a which fit around a bent-off lug 12a, of the driving ring 12. The lug 12a is movable in an opening 2b of the base plate 2. To cause the coupling jaws 13a to remain connected to the lug 12a, a coil spring 15 on a fixed pin 14 exerts a counterclockwise moment of rotation on the driving pawl 13.

In order to obtain exposure times of varying duration, the above-described shutter arrangement is provided with an electronically-controlled timing device, which is adapted to hold the shutter drive in the open position of the shutter blades for varying periods of time. For this purpose, an edge 4c of the released driving disc 4 is intercepted by a lug 16a bent from an electromagnetically-controlled arresting lever 16. The arresting lever 16 is pivotally mounted on a pin 17 and is acted on by a spring 18 which causes the lever 16 to engage the fixed pin 2c. In order to keep the arresting lever 16 in the arresting, or locking, position illustrated in FIG. 1, a two-armed supporting lever 19 is provided. The supporting lever is pivotally mounted on a pin 20 of the base plate 2, and is urged counterclockwise by a coil spring 21. The supporting lever 19 carries, at one end, a pin 22 which serves as a prop for the arresting lever 16 upon impingement of the driving disc 4. The other end of the supporting lever 19 has an articulated member 23 which forms the armature of an electromagnet 24.

As already indicated, the arresting lever 16, by itself, is not able to block the running down of the driving disc 4, since this requires the additional support of the lever 19. But the lever 19 can give this support only if it is kept in the position shown in FIG. 1 by the energized electromagnet 24. If the electromagnet 24 is unenergized, the driving disc 4 is able, by means of its edge 4c, to pivot the arresting lever 16, together with the supporting lever 19, and to continue its running-down motion. During this motion, the bent-off lug 16a of the arresting lever 16 slides along the concentric peripheral piece 4d of the driving disc 4.

In order to supply the electromagnet 24 with direct current, a contact switch is provided, which consists of a fixed contact pin 25 and a contact spring 26 cooperating therewith and fixed to the base plate 2 by means of two screws 27.

The open contact switch 25, 26 is closed by means of an actuating lever 28 mounted on a bearing pin 29 of the base plate 2. A spring 30, which is more powerful than the spring 26, presses against the lever 28 and forces it to push the spring 26 against the fixed contact pin 25. In order to keep the contact switch 25, 26 open when the shutter is inoperative, a transmission lever 31 is pivotally mounted coaxially with the release lever 9 of the shutter. The actuating lever 28 then abuts against a lug 31a of the transmission lever 31. Associated with the transmission lever 31 is a spring 32 which tends to keep the lever 31 in engagement with the bent-off arm 9b of the release lever 9. The spring 32 is stronger than the spring 30 so that it is able to keep the lever 28 in the position associated with the open position of the contact switch 25, 26, illustrated in FIG. 1, in spite of the pressure of the spring 30.

In order to keep the contact switch 25, 26 closed until the shutter has completed its cycle, a locking device, associated with the contact switch 25, 26, keeps that switch closed independent of whether or not the release lever 9 is permitted to return. The locking device may consist of a two-armed lever 33 pivotally mounted on a pin 34 and urged clockwise by a spring 35. The arm 33a of the arresting level 33 is shaped so that it is able to engage behind the bent-off lug 31b of the transmission lever 31 when the release lever 9 is depressed, i.e., when the contact switch 25, 26 is closed. The other arm 33b of the arresting level 33 is shaped so that it is able to engage located in the path of motion of the projection 4a of the driving disc 4. The arrangement may be such that in the final phase of the running down of the shutter, the projection 4a impinges on the lug 33c of the arresting lever 33. The result is a counterclockwise pivoting of the arresting lever. This removes the arm 33a of the arresting lever 33 from engagement with the bent-off lug 31b, so that if the release lever 9 is released, the transmission lever 31 returns to the starting position illustrated in FIG. 1, while simultaneously opening the contact switch 25, 26.

In addition to the contact switch 25, 26, another contact switch, associated with the electronic timing device, is arranged in the shutter. The additional contact switch is closed in the non-operating position of the shutter and open when the shutter starts to run down. The switch comprises a fixed contact pin 36 and a contact spring 37 mounted on the base plate 2. An angle lever 38 mounted on a pin 39 of the base plate 2 is urged counterclockwise by a spring 40 and is designed to actuate the contact spring 37. The influence of the spring 40 causes the arm 38a of the angle lever 38 to engage the pin 12b of the shutter blade driving ring 12 when the shutter is inoperative. The other arm 38b of the lever 38 comprises a bent-off lug 38c against which abuts the contact spring 37 of the contact switch 36, 37. A closing spring 42 acting against the spring 40 of the angle lever 38, also acts on the pin 12b of the shutter blade driving ring 12 to prevent the shutter blades from executing an opening motion during the cocking of the driving disc 4.

Figure 3:
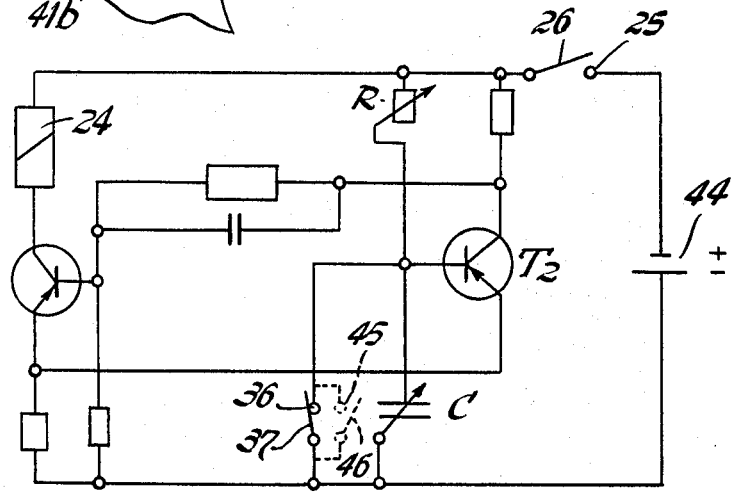
FIG. 3 shows a schematic circuit diagram of the electronic timing device built into the shutter, according to FIG. 1.

In the embodiment illustrated, the electronic timing device comprises a delayed-action circuit composed of resistors and capacitors schematically illustrated in FIG. 3. In the schematic diagram, the two contact switches operable by the release member 9 and the shutter blade driving ring 12, respectively, are again designated as switches 25, 26 and 36, 37. The electromagnet 24 as well as a transistor $T_1$ are arranged in series with the contact switch 25, 26, and a current source 44. The contact switch 36, 37, a capacitor C connected to a second transistor $T_2$, and a variable resistor R are arranged in a circuit of their own. The resistor R and the capacitor C form the delayed-action circuit. The arrangement is completed by additional resistors and capacitors typical of a timing circuit.

In cooperation with the shutter illustrated in FIG. 1, the above-described timing device operates in the following manner:

When the release lever 9 is depressed, the contact switch 25, 26 is first closed by means of the levers 28 and 31. This closing of the contact switch takes place before the arresting lever 6 releases the cocked driving disc 4 of the shutter. Immediately prior to the release of the driving disc 4, the arresting lever 33 engages, by means of its arm 33a beyond the lug 31b the transmission lever 31, thereby locking the latter. The contact switch 25, 26 remains closed, even if the release lever 9 is released immediately.

The closing of the contact switch 25, 26 causes the transistor $T_1$ to become conductive and at the same time blocks the transistor $T_2$. The flow of current through the transistor $T_1$ excites the electromagnet 24 which attracts the armature 23 of the arresting lever 16, thereby securing the same in the locking position shown in FIG. 1. The release of the driving disc 4 starts the running down of the shutter, with the actuating lever 39 first opening the contact switch 36, 37. This permits the charging of the capacitor C. When the driving disc 4 is in the position corresponding to the open position of the shutter blades, it impinges with its edge 4c on the bent-off lug 16a of the arresting lever 16, whereby the running down of its motion is interrupted. Consequently, the shutter remains opened until the electromagnet 24 becomes de-energized. This happens when the capacitor C is charged to such a degree that the transistor $T_2$ becomes conductive. At that instant, owing to the feedback coupling of the two transistors $T_1$ and $T_2$, the current in the transistor $T_2$ avalanches, while current through the transistor $T_1$ drops to zero. As a result, the electromagnet 24 is no longer supplied with current, so that its magnetic field collapses and the armature 23 is released. Since the arresting lever 16 is thereby deprived of its prop by the supporting lever 19, the driving disc 4 is able to rotate the former and to continue running down while simultaneously closing the shutter blades. Shortly before the driving disc 4 reaches the rest position, its projection 4a impinges on the lug 33c of the arresting lever 33. The transmission lever 31 is thus unlocked, in the manner described above, and the contact switch 25, 26 is opened again.

The series resistor R shown in the schematic diagram in FIG. 3, as well as the capacitor C associated therewith, are variable. For example, the resistor may be a potentiometer to cooperate with the exposure time-setting member 41 illustrated in FIG. 2. Likewise, the resistor R may comprise several different resistances connected in parallel, each of which can be switched on individually by means of a slider arranged on the exposure time-setting member 41. The resistor R may also be a photo-electric cell or a photo electric resistor, whose resistance is determined by the light intensity prevailing in each particular case. The capacitor C may be a variable or rotary capacitor or may comprise a plurality of different capacitances connected in parallel, which can be switched on separately or in groups. In the case of an automatic timing system with a photo-electric resistor acting as resistor R, the variable capacitor C may be used for the preselection of specific diaphragm apertures or for taking into consideration different film sensitivities. But if no automatic timing system exists, the capacitor C may be varied by means of the exposure time-setting member 41. In such a case both the resistor R and the capacitor C can be varied individually or jointly by means of the exposure time-setting member for the purpose of obtaining different exposure times.

Figure 2:
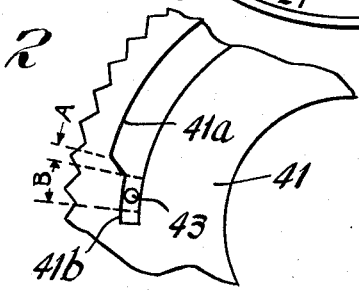
FIG. 2 is a partial view of a setting member cooperating with the locking device in the setting position for B-exposures.

In order to be able to obtain exposure times of any desired duration, with the above-described shutter in the case of B-exposures, there is developed on the exposure time setting member 41, shown partially in FIG. 2, a cam consisting of two sections 41a and 41b with which a pin 43 arranged on the arresting lever 33 engages. In case a photo-electric cell or a photo-electric resistor is used as resistor R, the exposure time setting member 41 serves as a switch which can be set at the setting positions A (automatic) and B. On the other hand, for instance, where a resistor R is used which can be varied by means of the exposure time-setting member, a setting range for instantaueous exposure times and a B setting position are provided on the member 41. In the A setting position or in the instantaneous exposure time range, the pin 43 of the arresting lever 33 is in the region of section 41a of the cam. The arresting lever 33 is able to move freely, owing to the width of the partial member 41a, and to change to its arresting or locking position when the release lever 9 is depressed. But if the exposure time-setting member 41 is set at B, the pin 43 of the arresting lever 33 enters section 41b of the cam. This prevents the arresting lever from bringing about a locking of the transmission lever 31 when the release lever 9 is actuated. The result is that the contact switch 25, 26 remains closed only as long as the release lever 9 is kept in depressed position.

Provision is made, as shown in dotted lines in FIG. 3, for another contact switch 45, 46, connected in parallel with the contact switch 36, 37, and closed when the exposure time-setting member 41 is set at B. This contact switch 45, 46 is designed to prevent the charging of the capacitor C, so that the duration of the opening time of the shutter is determined exclusively by the duration of the depression of the release lever 9. This device is especially useful for the assembly and control of a camera, in which the shutter must be kept open, even in full daylight, for the purpose of adjusting and checking the optical system.

What is claimed is:
1. A photographic shutter comprising: a shutter blade; driving means to actuate said shutter blade to open and to close the same; a shutter release operatively connected to said driving means to initiate the opening of said shutter blade; an electronically-controlled exposure timing device; a switch operatively connected to said shutter release to be actuated in order to switch on the electronically-controlled exposure timing device when said shutter release is operated to initiate the opening of said shutter blade; and a locking device operatively connected to said shutter release and engageable with said switch to hold said switch in its closed position until the running down of the exposure is completed.

2. A photographic shutter comprising: a shutter blade; driving means to actuate said shutter blade to open and to close the same; a shutter release operatively connected to said driving means to initiate the opening of said shutter blade; an electronically-controlled timing device; a switch operatively connected to said shutter release to be actuated in order to switch on the electronically-controlled timing device when said shutter release is operated to initiate the opening of said shutter blade; an actuating lever operatively connected to said shutter release for actuating said switch; a two-armed arresting lever operatively connected to said shutter release for locking said switch in the closed position upon actuation of said shutter release, one of the arms being operatively connected to said actuating lever and the other of said arms extending into the path of motion of said driving means whereby said driving means pivots said two-armed arresting lever to its inoperative starting position at a pre-determined time after the actuation of said shutter release.

3. The photographic shutter of claim 2 comprising, in addition, a manually operable shutter speed setting member for adjusting said shutter to make B-exposures, said setting member being connected to said arresting lever to hold the same in its inoperative starting position in order to make B-exposures.

4. The photographic shutter of claim 3 in which said setting member has a B-setting position and a setting position corresponding to an automatic position and a range of positions corresponding to predetermined exposure times, and a cam engaging said arresting lever to hold said arresting lever in its inoperative position when said setting member is set in the B position.

5. A photographic shutter comprising: an electronically-controlled exposure timing device having a delayed-action circuit comprising a resistor, a capacitor and a source of charging current for said capacitor; a shutter blade; a shutter release; a first switch operatively connected to said shutter release and connected to said capacitor and operating to permit said capacitor to receive charging current in one position of said switch; a shutter blade driving mechanism; said shutter release being connected to said shutter blade driving mechanism to actuate the same to initiate operation thereof; a shutter speed control having a plurality of setting positions including a B setting position; a second switch connected in parallel with said capacitor and controlled by said shutter driving mechanism to be opened by the same immediately after the beginning of the running of the shutter thus permitting charging of the capacitor; and a third switch connected in parallel with said second switch and actuated by said shutter speed control to be closed when said shutter speed control is in its B setting position.

6. The photographic shutter of claim 2 wherein said shutter release has a transmission lever engageable with said actuating lever and said arresting lever, and wherein said transmission lever is movable by said shutter release to engage said actuating lever to allow said switch to close, and wherein said transmission lever is engageable with said arresting lever to allow said actuating lever and said switch to remain the closed position after said shutter release has returned to its normal position.

References Cited

UNITED STATES PATENTS

| | | | |
|---|---|---|---|
| 1,828,215 | 10/1931 | Barenyi | 95—63 |
| 1,908,333 | 5/1933 | Eitzen | 88—24 |
| 2,179,718 | 11/1939 | Fedotoff | 95—60 |
| 2,448,736 | 9/1948 | Rabinowitz | 95—53 |
| 3,205,804 | 9/1965 | Topaz | 95—55 |
| 3,208,365 | 9/1965 | Cooper | 95—60 |

JOHN M. HORAN, *Primary Examiner.*